United States Patent
Bauser et al.

(10) Patent No.: US 12,335,095 B2
(45) Date of Patent: Jun. 17, 2025

(54) TRANSMITTER, METHOD AND COMPUTER PROGRAM

(71) Applicant: Endress+Hauser Conducta GmbH+Co. KG, Gerlingen (DE)

(72) Inventors: Maximilian Bauser, Simmozheim (DE); Oliver Durm, Benningen am Neckar (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 0 days.

(21) Appl. No.: 18/540,045

(22) Filed: Dec. 14, 2023

(65) Prior Publication Data
US 2024/0205085 A1 Jun. 20, 2024

(30) Foreign Application Priority Data
Dec. 20, 2022 (DE) .................. 10 2022 134 142.9

(51) Int. Cl.
*H04L 41/0866* (2022.01)

(52) U.S. Cl.
CPC .............................. *H04L 41/0866* (2013.01)

(58) Field of Classification Search
CPC ...... H04L 41/0866; G01D 5/00; G01D 21/00; G01D 21/02; H04W 4/38; H04W 4/80
See application file for complete search history.

(56) References Cited

U.S. PATENT DOCUMENTS

| | | | | |
|---|---|---|---|---|
| 5,838,572 A * | 11/1998 | Hofstetter | ............ | B65G 1/1371 |
| | | | | 700/235 |
| 5,911,147 A * | 6/1999 | Onodera | ............. | G06F 12/0653 |
| | | | | 711/202 |
| 10,313,301 B1 * | 6/2019 | Lin | ...................... | H04L 61/5007 |
| 2001/0009536 A1 * | 7/2001 | Shin | ........................ | G11C 7/16 |
| | | | | 710/316 |
| 2002/0035659 A1 * | 3/2002 | Kelly | .................... | G06F 13/409 |
| | | | | 710/317 |
| 2004/0037768 A1 * | 2/2004 | Jackson | .................... | C01B 7/20 |
| | | | | 423/500 |
| 2016/0369761 A1 * | 12/2016 | Schnellinger | ....... | F02N 11/0866 |
| 2017/0317754 A1 * | 11/2017 | Kangas | ................ | H04B 10/807 |
| 2019/0145371 A1 * | 5/2019 | Schnellinger | ............. | H02J 1/10 |
| | | | | 290/31 |
| 2023/0079418 A1 * | 3/2023 | Hamilton | ............ | H04L 63/1408 |
| | | | | 726/22 |

FOREIGN PATENT DOCUMENTS

CN 114114970 A * 3/2022 ......... G05B 19/0423
DE 102009029495 A1 3/2011

* cited by examiner

Primary Examiner — Richard G Keehn
(74) Attorney, Agent, or Firm — Mark A. Logan; Endress+Hauser (USA) Holding, Inc.

(57) ABSTRACT

A measuring transducer comprises at least two slots, at least one module that is associated with a slot, and a data processing unit with a memory. The data processing unit is designed to read out whether and to which slot the module is assigned, and is designed to generate a unique code for the measuring transducer assembly on the basis of the module and the determined slot. One digit of the code is assigned to each slot. Also disclosed is a method having such a measuring transducer.

13 Claims, 4 Drawing Sheets

TRANSMITTER, METHOD AND COMPUTER PROGRAM

CROSS-REFERENCE TO RELATED APPLICATION

The present application is related to and claims the priority benefit of German Patent Application No. 10 2022 134 142.9, filed on Dec. 20, 2022, the entire contents of which are incorporated herein by reference.

TECHNICAL FIELD

The present disclosure relates to a measuring transducer, a method, and a computer program.

BACKGROUND

Generally speaking, a measuring transducer, also called a transmitter, is a device that converts an input variable into an output variable according to a fixed relationship. In process automation technology, a field device, for example, is connected to a measuring transducer. "Measuring transducer" and "transmitter" are used synonymously herein. The field device is a sensor, for example. Its raw measured values are processed in the measuring transducer, e.g., averaged or converted by means of a calibration model to another variable—for example, the process variable to be determined—and possibly transmitted—to a control system, for example.

Measuring transducers are of modular design, i.e., measuring transducers can be changed in the configuration at any time even after delivery, for example by installing modules later. FIG. 1 shows a housing 2 of a measuring transducer 1. The measuring transducer 1 comprises a basic module 3 with a data processing unit 6. The measuring transducer 1 comprises several slots 5.

The user often personally carries out the modification. In this case, the exact hardware configuration is not easy to determine, for example in order to answer service requests quickly. In addition, the activation codes stored in the device must be determined. Activation codes are codes that activate a functionality after purchasing the transmitter without having to change the hardware. Subsequent device changes are therefore difficult or time-consuming to determine.

SUMMARY

The object of the present disclosure is to provide the device assembly in a simple manner.

The object is achieved by a measuring transducer comprising at least two slots; at least one module which is assigned to a slot; and a data processing unit with a memory, wherein the data processing unit is designed to read out whether and to which slot the module is assigned, and is designed to generate a unique code for the measuring transducer assembly on the basis of the module and the determined slot, wherein one digit of the code is assigned to each slot.

This results in a unique identification code that can be read out in the menu of the transmitter, for example, to determine the device configuration. This relatively short identifier code can easily be written down, transmitted over the phone or otherwise. Subsequent device changes are thereby immediately apparent. This results in easier and faster support and/or troubleshooting.

One embodiment provides that the module is designed as a hardware module, wherein the hardware module is plugged into a slot, wherein the data processing unit is electrically connected to the module via the slot, and wherein the data processing unit is designed to read out the slot into which the module is plugged, and to generate a unique code on the basis of the module and the determined slot.

One embodiment provides that the hardware module is a base module including the voltage supply, current input or output, digital input and/or output, relay or a communication module, for example for Profibus, Modbus, Fieldbus, Ethernet, HART, mobile radio, wirelessHART, Bluetooth, Wifi, or others.

One embodiment provides that the hardware module comprises a memory which comprises its configuration.

One embodiment provides that the module is designed as a software module, wherein the data processing unit is designed to read out whether the software module is activated and to generate a unique code on the basis of the module and the determined slot.

One embodiment provides that the memory comprises an assignment table which comprises all possible modules and configurations.

One embodiment provides that the measuring transducer comprises a data input, in particular via a communication module or by means of a digital memory card, wherein the data processing unit is designed to update the assignment table by means of data from the data input.

One embodiment provides that the measuring transducer comprises four or eight slots.

One embodiment provides that the measuring transducer comprises a display and the unique code of the measuring transducer assembly is displayed on the display.

One embodiment provides that the measuring transducer comprises a data output, in particular a communication module, wherein the data output is designed to send the unique code by means of the data processing unit, in particular to the manufacturer of the measuring transducer.

The object is also achieved by a method, comprising the steps: reading out whether and to which slot a module is assigned in a measuring transducer as described above; and generating a unique code for the measuring transducer assembly on the basis of the module and the determined slot.

The object is also achieved by a computer program comprising instructions which, when the program is run by a measuring transducer described above, cause the measuring transducer to perform the steps of the method described above.

BRIEF DESCRIPTION OF THE DRAWINGS

This is explained in more detail with reference to the following figures.

In the figures, the same features are labeled with the same reference signs.

DETAILED DESCRIPTION

Figure 1:
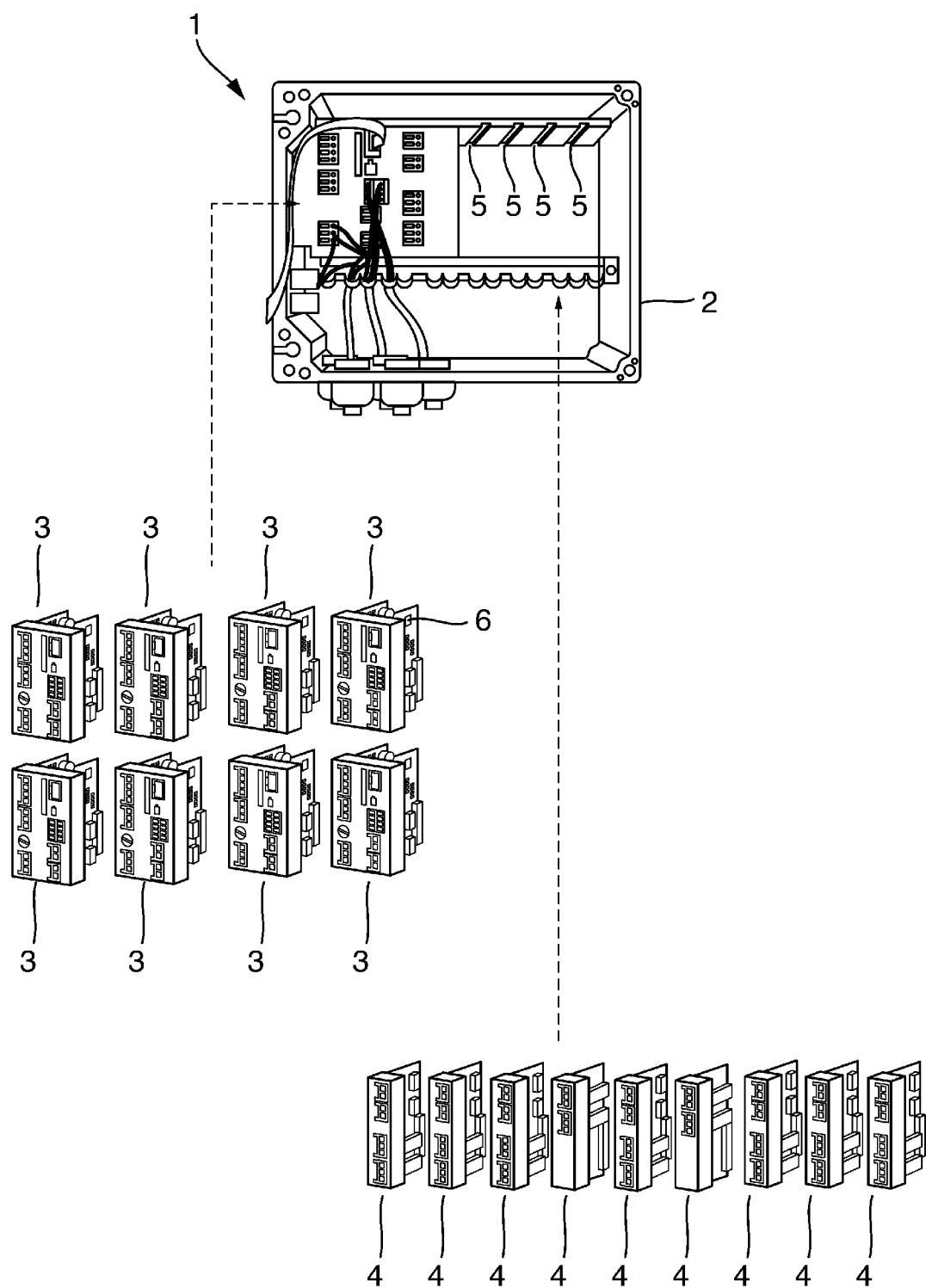
FIG. 1 shows an open measuring transducer with different modules.

FIG. 1 shows a housing 2 of a measuring transducer 1. The measuring transducer 1 comprises a basic module 3 with a data processing unit 6. The measuring transducer 1 comprises several slots 5. Multiple modules 4, which are designed as base module 3, are shown on the left in the lower region. Each measuring transducer 1 requires a base module 3 which then comprises a data processing unit 6 with memory 6*a*. The base module 3 is also inserted into a slot 5, usually the slot "0" or "1." Depending on the configuration of the base module, it also requires two slots. The data processing unit 6 is shown as an example of a base module 3. The measuring transducer 1 is supplied with energy (voltage) via the base module 3. However, eight different configurations of the base module are shown. One must be selected for the measuring transducer.

Various modules 4 are shown at the bottom right, which add functionalities to the measuring transducer 1. Possible modules are, for example, current input or output, digital input and/or output, relays or a communication module, for example for Profibus, Modbus, Fieldbus, Ethernet, HART, mobile radio, wirelessHART, Bluetooth, Wifi, or others. Sensors 100 are connected to such modules, see below and FIG. 2. These are referred to as hardware modules. They are also called expansion modules.

Generally speaking, a measuring transducer 1, also called a transmitter, is a device that converts an input variable into an output variable according to a fixed relationship.

Figure 2:
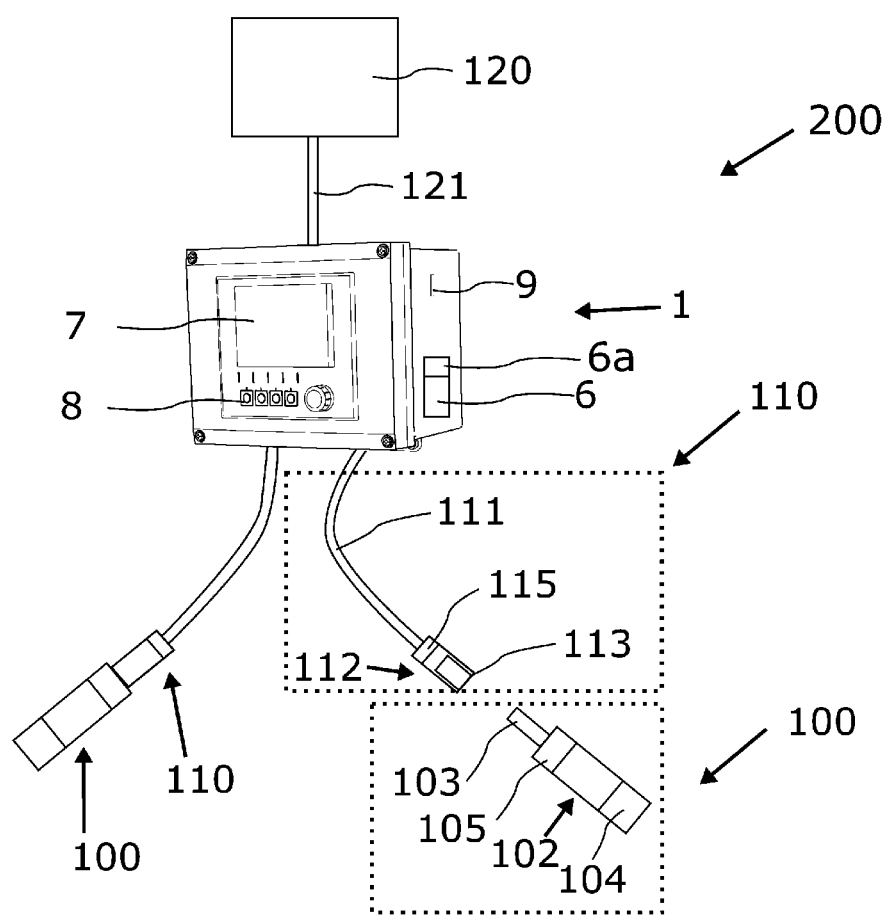
FIG. 2 shows a measuring transducer.

The measuring transducer 1 is used in a so-called sensor arrangement 200. The sensor arrangement 200 thus comprises at least the measuring transducer 1 and a sensor 100. In FIG. 2, the measuring transducer 1 is connected to the sensor 100 via a cable 111. The raw measured values of the sensor 100 are processed in the measuring transducer 1, e.g., averaged an/or converted by means of a calibration model to another variable—for example, the process variable to be determined—and possibly transmitted—to a control system, for example.

The sensor 100 comprises a first physical interface 103 via which the sensor 100 is connected to the measuring transducer 1 and thereby exchanges data (bidirectionally) and is supplied with energy (unidirectionally). The cable 111 is part of a connection element 110 which can be connected at one end to the measuring transducer 1 and at the other end to the sensor 100. At the sensor-side end, the cable 111 has a second physical interface 113 complementary to the first physical interface 103. The physical interfaces 103, 113 are configured as galvanically isolated interfaces, especially as inductive interfaces. The physical interfaces 103, 113 can be coupled together by means of a mechanical plug connection. The mechanical plug connection is hermetically sealed, such that no fluid, such as the medium to be measured, air, or dust can enter from the outside.

The sensor 100 comprises at least one sensor element 104 for detecting a measured variable of process automation. Sensor 100 will then be for example a pH sensor, also known as ISFET, generally an ion-selective sensor, a sensor for measuring redox potential, the absorption of electromagnetic waves in the medium, for example with wavelengths in the UV, IR and/or visible ranges, oxygen, conductivity, turbidity, the concentration of non-metallic materials or temperature with the respective measured variable.

The sensor 100 furthermore comprises a first coupling body 102, which comprises the first physical interface 103. The connection element 110 comprises a second, cylindrical coupling body 112 that is designed to be complementary to the first coupling body 102 and can be slipped with a sleeve-like end portion onto the first coupling body 102, wherein the second physical interface 113 is plugged into the first physical interface 103.

Sensor 100 comprises a data processing unit 105, e.g. a microcontroller, which processes the values of the measured variable, e.g. converts them into a different data format. The data processing unit 105 is designed for energy and space reasons to be rather small or economical with respect to the computing capacity and the memory volume. The sensor 100 is thus designed only for "simple" computing operations, for instance for averaging, preprocessing, and digital conversion. The data processing unit 105 converts the value that depends on the measured variable (i.e., the measurement signal of the sensor element 104) into a protocol that the measuring transducer 1 can understand.

The connection element 110 may likewise comprise a data processing unit 115. The data processing unit 105 is designed to be "small" and can serve as a repeater for the data.

Several sensors 100 can also be connected to a measuring transducer 1*b*. FIG. 2 shows two sensors 100, wherein only one of the two is provided with all of the reference signs. The same or different sensors can be connected. The left-hand one of the two is shown in the plugged-in state. Up to eight sensors 100, for example, can be connected to the measuring transducer 1. For this purpose, the measuring transducer 1 has corresponding modules 4 which are plugged into the slot 5.

The measuring transducer 1 is connected to a higher-level unit 120, such as a control system, via a cable 121. The measuring transducer 1 forwards the measured data via the cable 121 to a control system 120. In this case, the control system 120 is designed as a process control system (PLC, SPS), PC, or server. For this purpose, the measuring transducer 1 converts the data into a data format that the control system can understand, for example in a corresponding bus, such as HART, Profibus PA, Profibus DP, Foundation Fieldbus, Modbus RS485, or also an Ethernet-based field bus, such as EtherNet/IP, Profinet, or Modbus/TCP. For this purpose, the measuring transducer 1 has a corresponding module 4, i.e., a communication module.

The measuring transducer 1 comprises a display 7 and one or more operating elements 8, e.g., knobs or rotary knobs, buttons or soft keys, via which the measuring transducer 1 can be operated. For example, measured data of the sensor 100 or the information of the app 2 are displayed via the menu structure M by the display 7. The sensor 100 can likewise be configured and parameterized via the operating elements 8 and the corresponding view on the display 7. The display 7 may also be designed as a touch display; the operating elements 8 can then also be part of the touch display, viz., as touch operating elements. The measuring transducer 1 comprises a data processing unit 6 with a memory 6*a*. Likewise, the measuring transducer 1 can comprise an SD card slot 9. As the module, the measuring transducer 1 can also comprise one or more communication modules, such as Bluetooth, mobile radio (2G, 3G, 4G, 5G) or other, possibly also wireless, bus protocols, such as WirelessHART.

Figure 3:
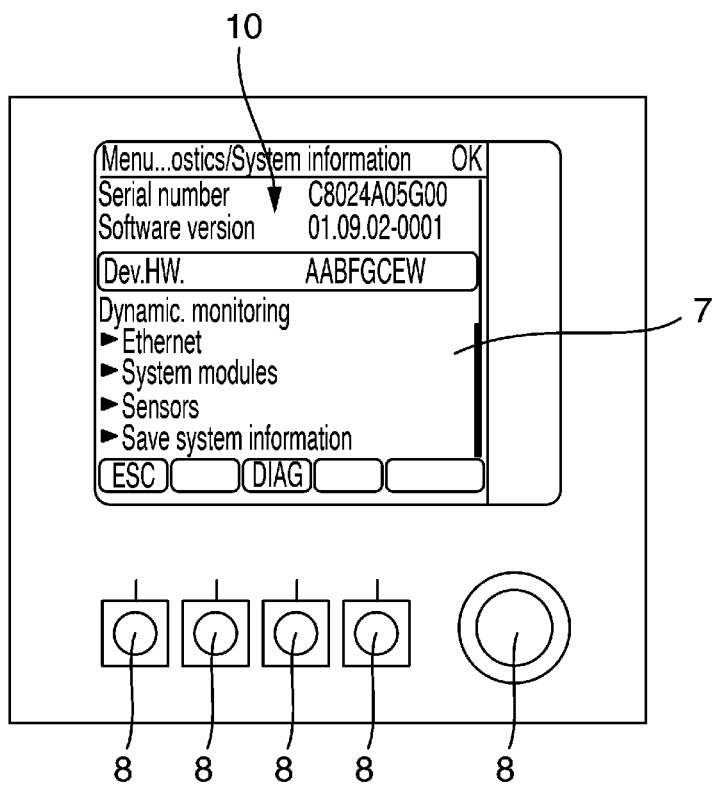
FIG. 3 shows the display of a measuring transducer.

FIG. 3 shows the display of the measuring transducer 1 with the code 10 of the device configuration generated by the measuring transducer 1 or its data processing unit 6. This is explained in more detail below with reference to FIG. 4*a/b*.

Figure 4A:
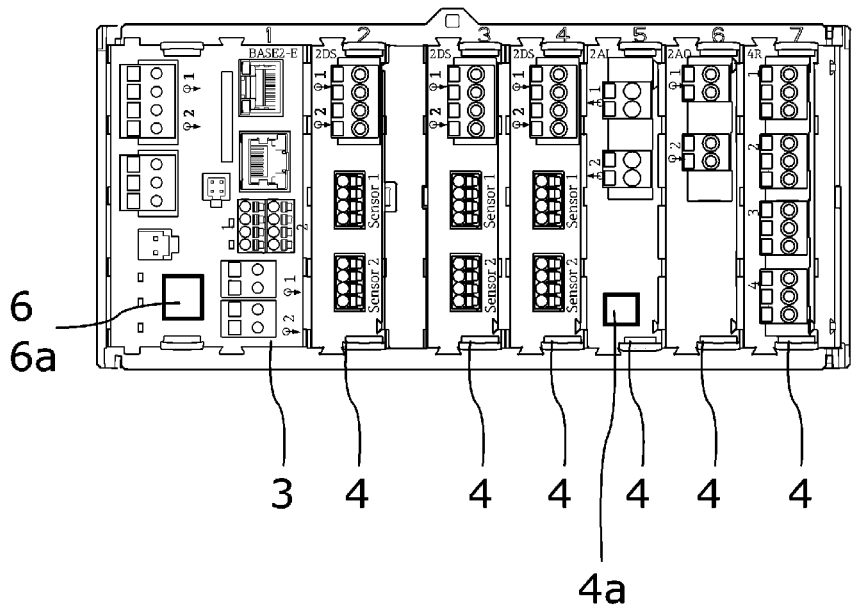
FIG. 4a/b show a front view of the measuring transducer or the display.
Figure 4B:
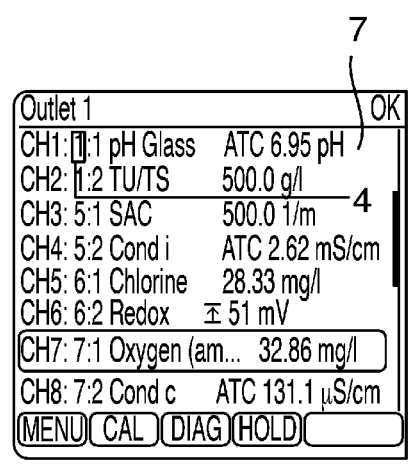

FIG. 4*a* shows a configuration of the measuring transducer 1 with eight modules which are numbered 0-7. The base module 3 is, for example, in the slot 0 and 1. This slot is referred to as "0+1." The remaining are filled with hardware modules 4. In the example shown, this results in the configuration described below which can be shown in the display (see FIG. 4*b*). The inputs of the sensors are assigned to the measurement channels in ascending order of the slots and ports. A slot can comprise multiple ports.

The display "CH1: 1:1 pH Glass" means: Channel 1 (CH1) is slot 1 (base module): Port 1 (input 1), pH glass sensor Outputs and relays receive their function as a designation, i.e., for example, "current output," and are displayed in ascending order with slot and port numbers.

The data processing unit 6 of the measuring transducer 1 is designed to read out whether and to which slot 5 a module 3, 4 is assigned. A unique code 10 for the measuring transducer configuration is generated on the basis of the module 3, 4 itself and the determined slot 5.

As mentioned above, the modules are hardware modules, wherein the hardware module 3, 4 is plugged into a slot 5, and the data processing unit 6 is electrically connected to the module 3, 4 via the slot 6. As mentioned, the data processing unit 6 is part of the base module 3.

The code "AABFGCEW," which is also shown in FIG. 3, then results, for example:

| Code: | A | A | B | F | G | C | E | W |
|-------|---|---|---|---|---|---|---|---|
| Slot: | 0 + 1 | 2 | 3 | 4 | 5 | 6 | 7 | 8 |

In the case of the slot "0+1," the following structure can be selected for the different base modules 3:
A=BASE-L
B=BASE-H
C=BASE E
D=BASE2-L
E=BASE2-H
Etc.

The above-mentioned base modules (BASE-L, BASE-H, BASE-E, BASE2-L, BASE2-H, etc.) are selected as examples and correspond, for example, to different generations or configurations of the base module such as different memory, controller, data communication options, etc. The assignment can also be selected in any other way.

The following structure can be selected for the other slots, i.e., slots 2-7:

| |
|---|
| A = 2DS |
| B = 485MP |
| C = 485DP |
| E = 485 (web server only) |
| F = 485 (Profibus DP) |
| G = 485 (Modbus 485) |
| ... |
| K = 2R |
| ... |
| P = AOR |
| Etc. |

The extension modules listed above (2DS, 485MP, 485DP, 485 (web server only), 485 (Profibus DP), 485 (Modbus 485), 2R, AOR, etc.) are selected as examples and correspond, for example, to certain functionalities such as current input or output, digital input and/or output, relay or a communication module, such as for Profibus, Modbus, Fieldbus, Ethernet, HART, mobile radio, wirelessHART, Bluetooth, Wifi or others. The assignment can also be selected differently.

The first digit of the code therefore corresponds to the corresponding base module 3. The additional modules 4 form the other digits. An eight-digit code 10 therefore arises when there are eight possible slots. A software module (see next section) can also be represented as a unique code at the corresponding location.

The term "module" can be understood more broadly. The module can be designed as a software module. A software module is, for example, an activation code. Activation codes are codes that activate a functionality after purchasing the measuring transducer 1 without having to change the hardware. The data processing unit 6 is then designed to read out whether the software module is activated in order then to generate a unique code on the basis of the software module and the determined slot. In this case, "determined slot" means the corresponding hardware module to which the software module is assigned. Accordingly if e.g., functionalities (software module) are activated which relate to a pH sensor that is connected in the first slot, the software module is also associated with the first slot.

The memory 6a has an assignment table which comprises all possible modules and configurations. The table therefore comprises all theoretically possible or practically possible configurations of the different modules (see above) and where these can be arranged.

The measuring transducer 1 has a data input, in particular via a communication module (see above) or by means of a digital memory card 9. In addition, the assignment table can update by means of the transmitted data. If new modules are therefore sold, the assignment table can be updated and the new module can be reliably detected.

In one embodiment, a module 4 comprises a memory 4a (symbolically indicated in a module 4 in FIG. 4a). The memory 4a comprises the configuration so that the assignment table does not have to be updated in a ninth module as described in the previous section, but rather the new module itself brings its configuration with it.

The measuring transducer 1 has a data output, for example via the above-described communication module. In addition, the unique code can be exported and sent, for example for maintenance and service purposes, to the manufacturer of the measuring transducer.

The invention claimed is:

1. A measuring transducer, comprising:
    at least two slots;
    at least one module that is associated with a slot; and
    a data processing unit with a memory,
    wherein the data processing unit is designed to read out whether and to which slot the at least one module is assigned, and is further designed to generate a unique code for the measuring transducer assembly on the basis of the at least one module and the determined slot,
    wherein one digit of the code is assigned to each slot, and
    wherein the unique code identifies a type of the at least one module and the determined slot.

2. The measuring transducer according to claim 1,
    wherein the at least one module is designed as a hardware module,
    wherein the hardware module is plugged into a slot,
    wherein the data processing unit is electrically connected to the at least one module via the slot, and
    wherein the data processing unit is further designed to read out the slot into which the module is inserted and to generate a unique code on the basis of the module and the determined slot.

3. The measuring transducer according to claim 2,
    wherein the hardware module is a base module including a voltage supply, current input or output, digital input and/or output, relay or a communication module.

4. The measuring transducer according to claim 2, wherein the hardware module includes a memory that includes its configuration.

5. The measuring transducer according to claim 1, wherein the at least one module is designed as a software module,
wherein the data processing unit is designed to read out whether the software module is activated and to generate a unique code on the basis of the at least one module and the determined slot.

6. The measuring transducer according to claim 1, wherein the memory includes an assignment table that includes all compatible modules and their respective configuration data.

7. The measuring transducer according to claim 6, further comprising:
a data input,
wherein the data processing unit is designed to update the assignment table using data from the data input.

8. The measuring transducer according to claim 1, wherein the at least two slots includes four or eight slots.

9. The measuring transducer according to claim 1, further comprising:
a display, and the unique code of the measuring transducer configuration is displayed on the display.

10. The measuring transducer according to claim 1, further comprising:
a data output, wherein the data output is designed to send the unique code via the data processing unit to a manufacturer of the measuring transducer.

11. A method, comprising:
providing a measuring transducer, including:
at least two slots;
at least one module that is associated with a slot; and
a data processing unit with a memory,
wherein the data processing unit is designed to read out whether and to which slot the at least one module is assigned, and is further designed to generate a unique code for the measuring transducer assembly on the basis of the at least one module and the determined slot,
wherein one digit of the code is assigned to each slot, and
wherein the unique code identifies a type of the at least one module and the determined slot;
reading whether and to which slot the at least one module is assigned in the measuring transducer; and
generating the unique code for the measuring transducer configuration on the basis of the at least one module and the determined slot, wherein the generating includes:
determining the type of the at least one module; and
assigning the type of the at least one module to the digit assigned to the determined slot.

12. The method according to claim 11, further comprising:
providing in the memory of the data processing unit an assignment table that includes all compatible modules and their respective configuration data; and
determining the type of the at least one module from the assignment table.

13. The method according to claim 11, wherein the at least one module includes a second module that is associated with a second slot, the method further comprising:
reading from a memory of the second module a device type of the second module and configuration data of the second module; and
including in the unique code the device type of the second module at a digit assigned to the second slot.

* * * * *